Nov. 19, 1963  H. WILEY  3,110,967
PLANIMETER DEVICE
Filed April 12, 1962  2 Sheets-Sheet 1

INVENTOR
Hugh Wiley

BY Bacon & Thomas
ATTORNEYS

Nov. 19, 1963     H. WILEY     3,110,967
PLANIMETER DEVICE

Filed April 12, 1962     2 Sheets-Sheet 2

INVENTOR
Hugh Wiley

BY Bacon & Thomas

ATTORNEYS

United States Patent Office 3,110,967
Patented Nov. 19, 1963

3,110,967
PLANIMETER DEVICE
Hugh Wiley, 1014 Oxford St., Berkeley 7, Calif.
Filed Apr. 12, 1962, Ser. No. 186,903
9 Claims. (Cl. 33—122)

This invention relates to planimeters and particularly to planimeters of the hatchet type. The invention involves novel planimeter features and a novel combination of planimeter and chart for directly reading the area of the figure being measured.

A "hatchet" type planimeter is a well-known type of instrument and comprises an elongated bar or frame having a pointed stylus at one end and a pursuit portion at the other end. The pursuit portion may be in the form of a fixed hatchet edge lying in a plane containing the stylus or it may be an edge of a wheel or roller, the axis of which is so oriented that the plane of rotation includes the stylus. By this arrangement the pursuit portion always follows or pursues the stylus and a tangent to its path of travel always passes through the point of the stylus, wherever it may be at that instant. Throughout the present specification and claims, the term "pursuing edge portion" will be employed to refer to either a fixed hatchet edge or a roller arrangement and the term "hatchet type" planimeter will refer to such an instrument having either a fixed hatchet edge or one or more wheels or rollers.

In the conventional operation of such an instrument, the approximate center of gravity of the area to be measured is first located and a line, usually rectilinear, is drawn from that center of gravity to some point in the periphery of the figure. The planimeter is then placed with the point of the stylus at the center of gravity of the figure and the position of the contact point of the pursuing portion is marked or otherwise noted.

The stylus is then caused to trace along the line previously drawn to the edge of the figure and is then caused to trace the outline of the figure back to the starting point then again inwardly to the center of gravity. The contact point of the pursuing portion will have been laterally displaced from its starting position, which new location is then marked or noted. The displacement of the contact point is as if it had been arcuately moved from its starting position to its final position about the center of gravity of the figure as a pivot. The area of the figure is the product of the distance from the stylus to the contact point and the length of the arc between the starting and final positions of the contact point.

The present invention involves novel features of such a planimeter instrument wherein means are provided for holding the stylus perpendicular to the figure at all times and ot thus render the instrument highly stable and accurate. The invention also contemplates the combination of the hatchet type planimeter with a transparent sheet to be placed over the figure to be measured. The transparent sheet is provided with means defining a starting point and an arc upon which the contact point or equivalent part of the pursuing portion rests when the point of the stylus is on the starting point. The arc is graduated directly in terms of area, although it may be graduated in other factors which are directly proportional to area. In use, the transparent sheet is placed over the figure to be measured with the starting point coinciding approximately with the center of gravity of the figure. The planimeter is then placed on the sheet with its stylus at the starting point and the contact point of the pursuing portion at the zero graduation on the arc. The figure is then traced in the manner previously described and at the completion thereof the area of the figure is read directly from the graduations along the arc. It is to be remembered that, at completion of the tracing, the contact point of the pursuing portion is again directly on the graduated arc. In certain forms of the invention, the contact point itself is not used as an indicating element, a separate pointer being provided which cooperates with the graduated arc, thus rendering it easier to read the answer since the contact portion of a wheel or a hatchet edge at least partially obscures the graduations and renders an accurate reading thereof somewhat difficult.

It is, therefore, an object of this invention to provide a planimeter and chart combination whereby the area of an irregular figure may be measured without marking the figure or providing any marks on the surface containing the figure.

Another object is to provide a novel planimeter structure especially adapted for use with the combination referred to.

Another object is to provide a planimeter and chart combination wherein the chart can be calibrated to read directly in any values proportional to the area of the figure.

A further object of the invention is to provide a planimeter and/or a combination as set forth that is simple and economical to construct yet reliable and accurate in operation.

Further and additional objects and advantages will become apparent to those skilled in the art as the description proceeds with reference to the accompanying drawings wherein.

Figure 1:
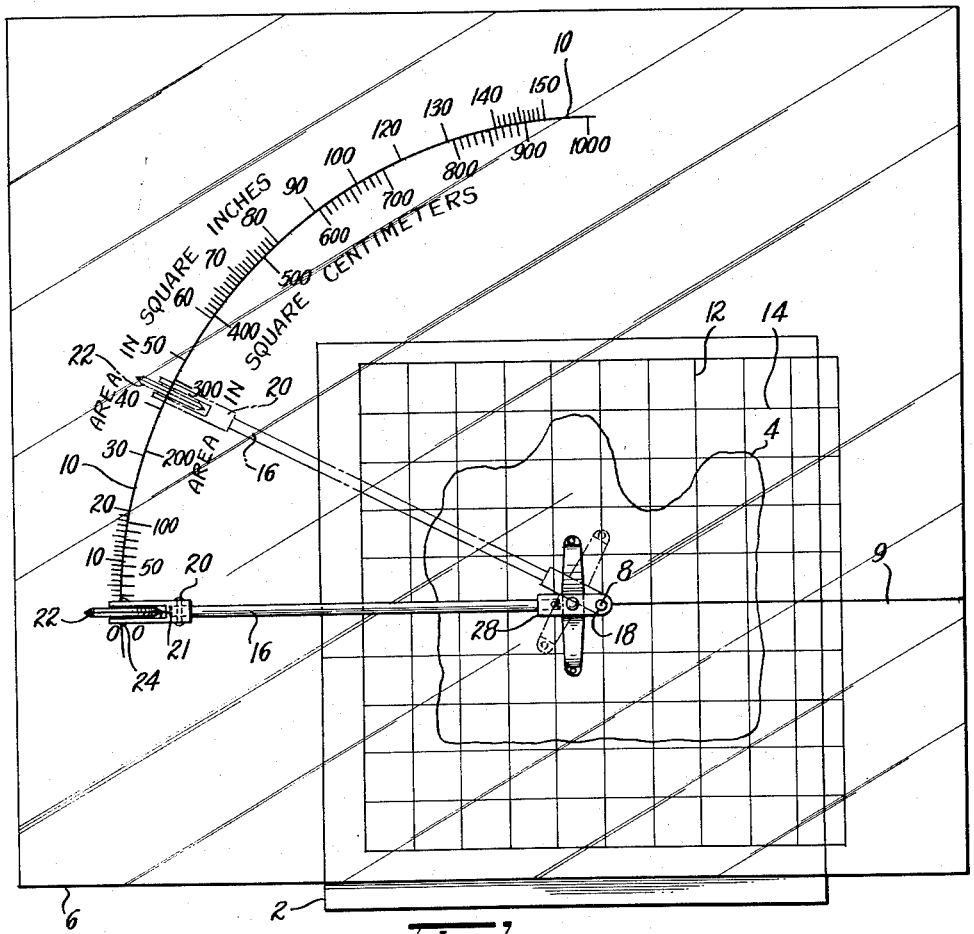
FIG. 1 is a plan view of one form of planimeter in combination with a novel chart according to the present invention.

Referring first to FIG. 1, a sheet of paper or the like 2 is shown having delineated thereon an irregular outline 4, the area of which is to be measured. A flat transparent sheet 6, which may be of plastic or the like, is placed over the sheet 2 to overlie the FIG. 4. The sheet 6 is provided with a mark defining a starting position or point 8 from which a straight line 9 extends. The point 8 and line 9 may be marked on the sheet 6 in any suitable manner. A circular arc 10 is also delineated on the sheet 6 and is a circular arc having its center at the point 8. As shown, the zero graduations on the arc 10 are directly in line with the line 9 previously referred to, although the line 9 may actually extend in any direction. As shown, the arc 10 is graduated in units of area, the outer side of the arc being graduated in square inches whereas the inside of the arc is graduated in units representing square centimeters. Also inscribed on the surface of the transparent sheet 6 is a light grid of lines 12 and 14 with the point 8 substantially at the center thereof. The grid of lines 12 and 14 are provided to make it easier to locate the approximate center of gravity of the irregular outline 4. By so placing the sheet 6 over the sheet 2 that the number of squares bounded by the outline 4 is approximately equal in each of the four quadrants having point 8 as a center, then the point 8 will be at the approximate center of gravity of the figure.

The planimeter comprises an elongated bar or frame 16 having a vertical pointed stylus 18 at its forward end. At its rearward end the frame or bar 16 is provided with a block 20 having a longitudinal slot 21 in which a sharp-edged wheel 22 is journalled on a pin 24. The wheel 22 and the axis of pin 24 are so positioned that the plane defined by the sharpened periphery of the wheel contains the point of the stylus 18 and thus as the stylus 18 is moved to the right as seen in the figures, the wheel 22 will follow or "pursue" the stylus.

To operate the device the sheet 6 is placed over the outline 4 in the same manner described, then the planimeter is placed over the assembly with the point of stylus 18 on the starting point 8 of sheet 6 and with the contact edge of wheel 22 lying directly on the zero graduation of the arc 10. It is to be noted that the distance from the point of stylus 18 to the contact point 26 of the wheel 22 is exactly equal to the radius of the arc 10 in this particular embodiment. After the parts are so positioned, the planimeter is manipulated to draw or trace along the line 9 with the point of stylus 18 until the stylus reaches the intersection of line 9 and the outline 4. The stylus is then traced around the outline 4 in a clockwise direction until the entire outline is traced back to the line 9. The stylus is then moved along the line 9 back to the starting point, at which time the planimeter will have assumed an angularly displaced position as shown by dotted lines in FIG. 1. The point at which the wheel 22 rests on the arc 10 now indicates the number of units of area within the irregular outline 4.

Figure 2:
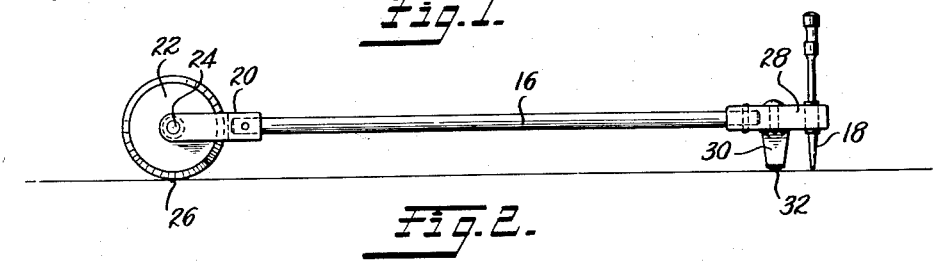
FIG. 2 is a side elevational view of the planimeter of FIG. 1.
Figure 3:
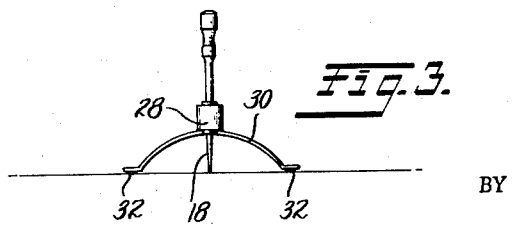
FIG. 3 is a front view of the planimeter of FIG. 2, as viewed from the right hand side thereof.

As is apparent, the stylus 18 is mounted on a block or fitting 28 carried by the rod 16 and which block is further provided with a bowed metal member 30, preferably of somewhat springy characteristics. The member 30 extends laterally of the bar 16 and downwardly so that its outer ends lie approximately in a plane containing contact point 26, and the point of stylus 18, and which plane is approximately perpendicular to the stylus 18. Thus, the spring arms 30 hold the stylus vertical at all times and insure maximum accuracy. Preferably, the spring arms normally hold the point of stylus 18 just at or slightly above the surface of sheet 6 to prevent gouging or scratching the sheet. As shown in FIGS. 2 and 3, the outermost ends of the spring arms 30 are dimpled or dished downwardly to define convex portions 32 to glide smoothly over the transparent sheet 6.

While the description thus far has been with specific reference to a planimeter having a rotatable sharpened wheel 22, it is to be understood that the combination described is of equal utility with a planimeter having a fixed hatchet edge providing a contact point 26, rather than a rotatable wheel. Such planimeters are well-known in the art.

Figure 4:
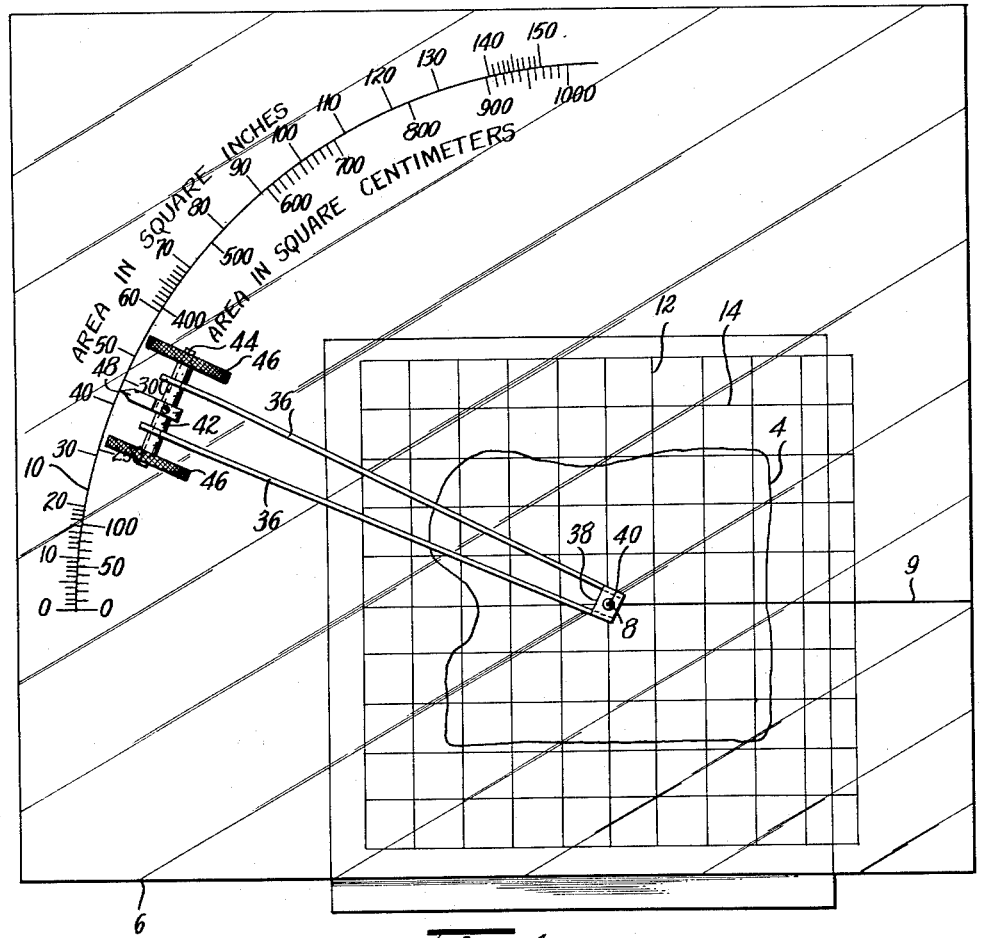
FIG. 4 is a plan view, similar to FIG. 1, but showing a different form of planimeter.
Figure 5:
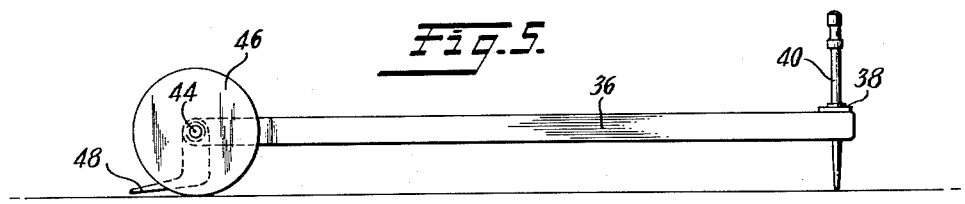
FIG. 5 is a side view of the panimeter of FIG. 4.
Figure 6:
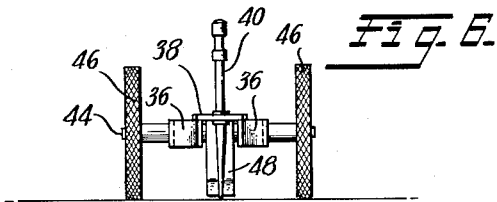
FIG. 6 is a front end view of FIG. 5.

A second embodiment of the invention is shown in FIGS. 4 through 6 and which is employed in exactly the same manner as described in connection with FIGS. 1, 2 and 3 but wherein a different form of planimeter structure is utilized. The transparent sheet 6 may be substantially identical in all respects to that described in connection with FIG. 1 and the same reference numerals are used to designate corresponding portions. By briefly referring to FIG. 1 again, it will be noted that the only significant variable determining the area of the irregular FIG. 4 is the angular displacement of the planimeter bar or frame 16 between its starting and final positions. Since the angular position at the end of the tracing step is of a predetermined value, the graduations or indications of area need not be exactly at the described radius from point 8. In other words, the arc 10 shown in FIG. 1 could be at a substantially greater radius than that shown and a pointer or similar indicator could be attached to the planimeter to extend outwardly to cooperate with the graduations of such arcuate scale, as long as the graduations at the greater radius correspond exactly to those at the radius described. In other words, graduations placed on an arc radially outwardly of the wheel 22 would still indicate the product of the distance from stylus 18 to contact point 26 and the length of the arc of displacement, which arc is at a radius equal to the distance from stylus 18 to point 26.

With the above discussion in mind, the form shown in FIG. 4 will be readily understandable. In this form of device, the planimeter comprises a frame having a pair of longitudinal side members 36 joined at one end by a suitable fitting 38 which supports a pointed stylus 40 at the forward end of the frame. At the rearward end of the frame a spacer 42 positions the outer ends of the members 36 and supports a fixed shaft 44 on which a pair of laterally spaced wheels or rollers 46 are journalled for independent free rotation. Preferably the peripheries of the wheels 46 are knurled or otherwise treated to provide non-slip characteristics. In this form of the invention, the arc 10 is positioned at a greater radius from point 8 than the arc described and shown in FIG. 1. It is positioned outwardly far enough to be clear of the wheels 46 so they do not obstruct a clear view of the graduations associated with the arc. A pointer 48 is fixed on the spacer 42 and extends downwardly and forwardly therefrom (see FIG. 5) so that its point just touches the arc 10 when the stylus is at the starting point 8. Thus, the final position of the planimeter, after the outline 4 has been traced, may be read directly at the tip of the pointer 48 in terms of square inches, square centimeters, or other values directly proportional to area. Obviously, the pointer need not be exactly centered on the frame of the planimeter but may be at any desired location laterally of that center as long as the operation is started with the pointer at the zero graduation. It is to be noted that the axis on which the wheels 46 rotate is perpendicular to the longitudinal axis of the planimeter frame so that the end of the frame carrying the wheels accurately follows or pursues the stylus 40.

While a limited number of specific embodiments of the invention have been shown and described herein, it is to be understood that the same are merely illustrative and that other forms may be resorted to within the scope of the appended claims.

I claim:

1. In combination: a hatchet type planimeter having a tracing stylus and a pursuing portion in spaced and aligned relation to said stylus; and a light transmitting sheet of material having means thereon defining a starting point, means on said sheet defining a circular arc having said starting point as its center, the radius of said arc being substantially equal to the distance from said tracing stylus to said pursuing portion, graduations and indicia along said arc, said indicia defining values directly proportional to the length of said arc from a predetermined zero position thereon, said pursuing portion including means cooperating with said graduations to indicate values thereof.

2. The combination defined in claim 1 including means on said sheet defining a path extending from said starting point, in a direction radial to said arc.

3. The combination defined in claim 2 wherein said last-named means defines a straight-line path extending radial to said arc and aligned with said zero position thereon.

4. The combination defined in claim 1 wherein said indicia indicate values equal to the product of said length of said arc and the distance from said starting point to said arc.

5. The combination defined in claim 1 including means fixed to said planimeter adjacent said stylus and having spaced portions slidably engageable with said sheet on opposite sides of said stylus to hold said stylus and edge portion in a substantially vertical plane.

6. The combination defined in claim 1 wherein said pursuing portion comprises a pair of laterally spaced wheels and a pointer therebetween to constitute said means cooperating with said graduations.

7. The combination defined in claim 6 wherein said pointer extends away from said stylus, beyond the periphery of said wheels and terminates on said arc when said stylus is at said starting point.

8. The combination defined in claim 1 including means on said sheet defining a rectangular grid of lines covering a substantial area thereof, said starting point being substantially at the center of said grid.

9. The combination defined in claim 1 wherein said pursuing portion comprises an arcuate contact member for engagement with said sheet; said last-named means comprising a pointer on said planimeter adjacent said contact member.

References Cited in the file of this patent

UNITED STATES PATENTS

| | | |
|---|---|---|
| 500,202 | Goodman | June 27, 1893 |
| 575,105 | Chollar | Jan. 12, 1897 |
| 839,177 | Dewitt et al. | Dec. 25, 1906 |
| 1,058,148 | Buvinger | Apr. 8, 1913 |

FOREIGN PATENTS

| | | |
|---|---|---|
| 79,948 | Germany | Feb. 23, 1895 |
| 1,011,841 | France | June 27, 1952 |
| 456,106 | Italy | Mar. 24, 1950 |